E. R. FREDERICK.
AUTOMOBILE WHEEL.
APPLICATION FILED JAN. 6, 1913.
1,069,059.
Patented July 29, 1913.
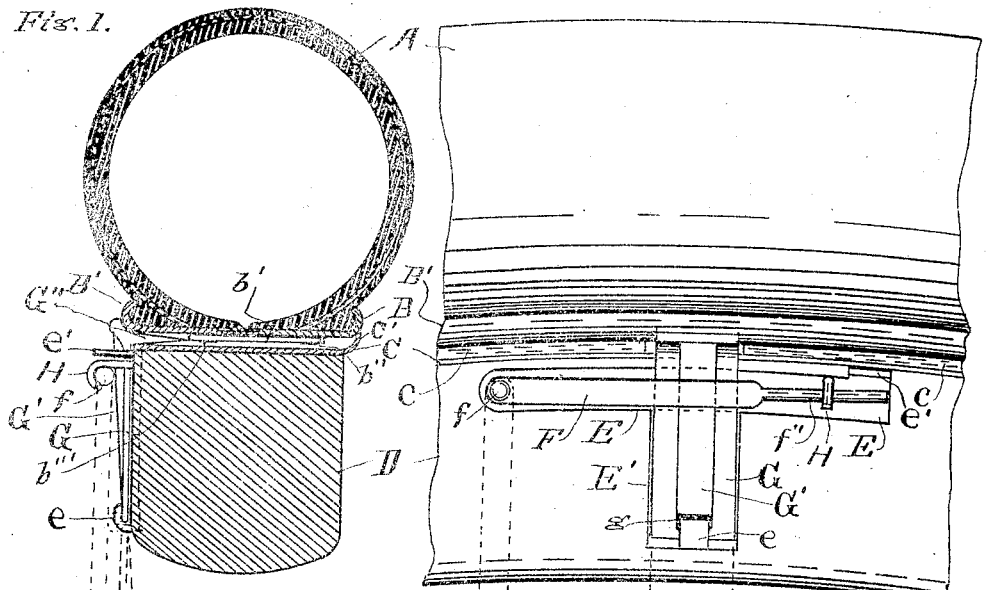
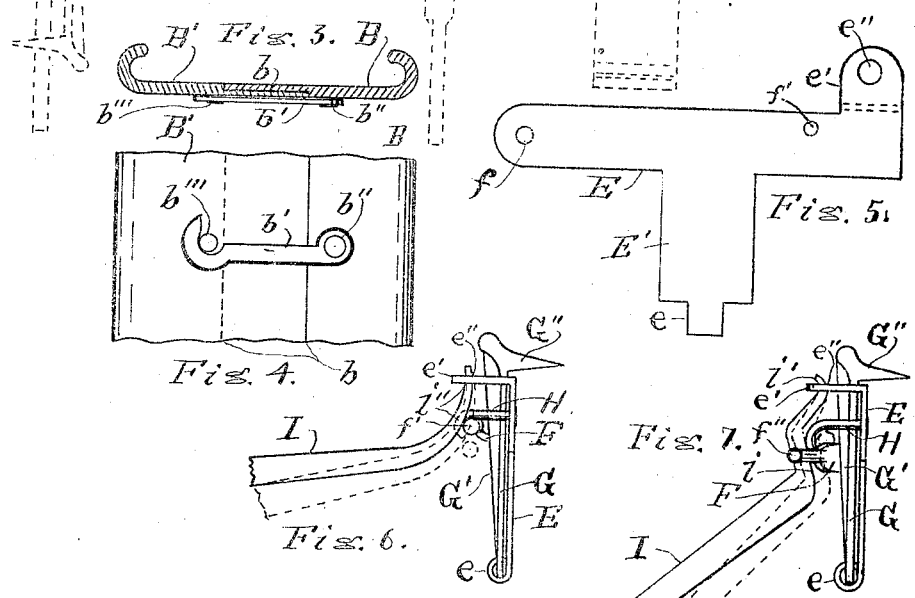
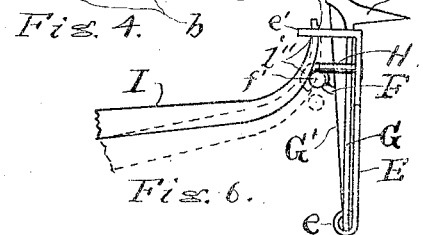
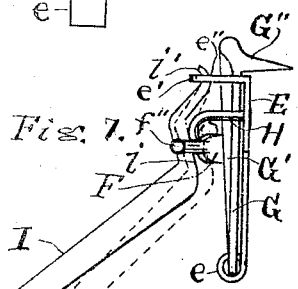
Witnesses
O. J. Wilder
A. B. Ellis
Inventor
Emil R. Frederick
Istries J. Cilley
Attorney

UNITED STATES PATENT OFFICE.

EMIL R. FREDERICK, OF SHELBY, MICHIGAN.

AUTOMOBILE-WHEEL.

1,069,059.   Specification of Letters Patent.   Patented July 29, 1913.

Application filed January 6, 1913. Serial No. 740,560.

*To all whom it may concern:*

Be it known that I, EMIL R. FREDERICK, a citizen of the United States, residing at Shelby, in the county of Oceana and State of Michigan, have invented certain new and useful Improvements in Automobile-Wheels, of which the following is a specification.

My invention relates to improvements in automobile wheel rims, and the manner of securing said rims to the fellies of the wheel, and the tires to the rims, and its objects are: First, to provide a means whereby a tire may be readily removed from, or replaced upon a wheel rim without any possible danger of injuring the tire. Second, to provide a means whereby when a tire has been placed upon a rim it may be immediately keyed to place without the necessity of a special set of detached tools with which to secure it, and, third, to provide a means whereby one half of the rim may be removed and replaced without the necessity of removing the other half, and whereby the two halves, after being jointed together on the wheel may be securely fastened together and held in place while the tire is being secured and inflated. I attain these objects by the mechanism illustrated in the accompanying drawing, in which—

Figure 1 is a transverse section of an automobile wheel felly, tire and rims showing how my device is applied. Fig. 2 is a side elevation of the same showing my device in place on the side of the felly, and the manner of forcing the securing element between the rim and the felly. Fig. 3 is a transverse sectional view of the divided rim showing how the two pieces are placed and secured together. Fig. 4 is an inside or bottom plan of the same. Fig. 5 is a plan of the support or base that is secured to the felly of the wheel for supporting the fastening device. Fig. 6 is an end elevation of the device showing the manner of unlocking the securing element when it is desired to remove a tire and rim, and Fig. 7 is the same showing the instrument and application to lock the securing device in place when the tire and removable portion of the rim have been replaced.

Similar letters refer to similar parts throughout the several views.

In the accompanying drawing A represents the pneumatic tire in common use on automobile wheels.

B represents the permanent portion of the rim, and B′ represents the removable portion of the same.

D represents the wooden felly of the wheel and C represents a felly band that is solidly shrunk upon the felly of the wheel for the purpose of rendering the felly absolutely firm and permanent. On one edge of the felly band C is formed an upwardly curved flange c′ that forms a bearing and stop to receive and support the permanent portion, B, of the felly band.

In the application of the said metal rim the part B is permanently secured to the felly band of the wheel, and supported in place by means of any available filling, as c, see Fig. 2. The two halves, B and B′ of the felly band are made thinner and lapped together b so as to form a smooth, perfect surface for the reception of the bearing part of the tire A.

When it is desired to place the tire A upon the wheel the half, B′, of the rim B B′, is removed by springing the latch or lever F so that the wedge G″ may be readily removed from under the rim. The tire is then placed upon the half, B, of the rim and the half, B′, of the rim is passed to place on the tire, as indicated in Figs. 1 and 2 and the two are drawn together by means of the hook b″, which is pivoted to B, as at b″ and is made to engage the pin b‴ to draw the two parts firmly together and hold them there until the supporting wedges, G″ are firmly anchored to place between the rim B′ and the felly band C, as indicated in Figs. 1 and 2.

In the construction of my appliance or attachment I first form a blank, E, E′, as shown in Fig. 5 and form a small cylindrical bearing at e for the support of the standard G that carries the wedge G″. This standard is cut away at g to form a pivotal bearing at the end which passes through the cylindrical bearing formed at e so that the body and wedge may be readily swung toward or from the tire. The wing e′ is bent to a position at right angles with the body of the support and is provided with a hole e″ designed to receive the ends of the adjusting lever I, as indicated in Figs. 6 and 7. A hook H is inserted and firmly riveted in the hole f′ to form a catch and secure support for the end f″ of the latch F. This latch, F, is pivotally secured to the support E by being pivoted thereto at f so that the end f″ may be readily swung from a horizontal, to a vertical position, or vice versa, as indicated in Figs. 1 and 2. It will be noted that the body G of the wedge G'' is provided with a wedge or incline G' so situated that when the latch F is swung upward to parallel position and is secured by the catch H the wedge G'' will be forced firmly between the rim B' and the felly band C so that the wedge and its bearing surfaces will be rigidly forced against the curved edge, of the rim, as indicated in Fig. 1. It is to be understood that several of these wedges will be distributed around the rim of the wheel so that the rim will be firmly held in place after the tire has been properly placed and inflated.

It will be readily understood that with the great bearing force necessary to hold the wedge G'' properly in place it would be impossible to spring the latch F to place back of the hook H. Hence I have prepared a specially formed lever for the purpose. This lever is formed with a firm body I which has an incline $i$ formed near one end that is designed to press against the end $f''$ of the latch F when the hook $i'$ is engaged in the hole $e''$. This incline, $i$, is made at a proper angle with the lever I and hook $i'$ so that when it has forced the end $f''$ of the latch F below the end of the hook H the lever will be forced back of the hook and will be held so securely that it cannot be removed therefrom without great effort. I minimize the effort necessary to remove the end $f''$ from behind the hook H by utilizing the end $i'''$ of the lever I to throw the end of the latch downward and backward or toward the wheel, as indicated in Fig. 6. To be more explicit, if the hook $i'$ is inserted in the hole $e''$ and the lever is carried downward from the position of the solid lines in Fig. 7, to the position of the dotted lines in said figure, the end of the latch F is forced downward and backward around the end of the hook H, and when it has passed the end of the hook H the incline of the part $i$ will cause it to drop back of the hook H where the concavity of the surface of the hook will hold it. On the other hand, if it is desired to release the latch F pass the point $i'''$ of the lever through the hole $e''$ in the arm $e'$ and carry the other end of the lever down from the position of the solid lines in Fig. 6 to the position of the dotted lines, when the convex form of the outer surface of the curve or end $i''$ will force the end $f''$ backward and downward sufficiently to carry it entirely free of the end of the hook H so that it may be free to drop entirely free from contact with the surface of the wedge G' and leave the wedge G'' free to be removed from beneath the rim B', as indicated by the dotted lines in Fig. 1.

It will be readily understood that the hook $b$ may be disengaged from the pin $b'''$ when the wedge is properly anchored to place between the rim B' and the felly band C.

What I claim as new, and desire to secure by Letters Patent of the United States, is:

1. In combination with an automobile wheel having a metal felly band around the wheel, a longitudinally divided and centrally lapped rim outside of the felly band that is fitted to receive and lock a pneumatic tire, a series of plates secured to the side of the wheel, a wedge shaped body pivotally supported on the plates and having a wedging end at right angles with the upper end of the body, a latch pivotally secured to the plates, and a hook on each plate for securing the free end of the latch to force the wedging end of the body between the metal felly band and the rim.

2. In combination with an automobile wheel, a metal felly band around the wheel, a longitudinally divided rim lapped by along the lines of division, a series of plates secured upon the side of the wheel, a latch and catch properly secured to said plates, wedges pivotally secured to said plates in position to be acted upon by the latch and forced between the metal felly band and the rim, an arm projecting out from the upper edge at one end of each plate and having a hole through each, a lever formed with one end having a hook and an incline adapted to pass through the hole in the arm and force the end of the latch back of the catch to hold the wedge to place, and the other end of the lever formed to enter the hole in the arm and force the latch from behind the catch.

Signed at Shelby, Michigan, December 31st, 1912.

EMIL R. FREDERICK.

In presence of—
 W. E. SOUTER,
 H. D. SOUTER.